(No Model.) 7 Sheets—Sheet 1.

H. HEINRICH.
PHOTOGRAPHIC CAMERA.

No. 436,098. Patented Sept. 9, 1890.

Witnesses:
A. Faber du Faur
William Miller

Inventor:
Hermann Heinrich
by A. Faber du Faur
his Att'y.

THE NORRIS PETERS CO., PHOTO-LITHO., WASHINGTON, D. C.

(No Model.) 7 Sheets—Sheet 3.

H. HEINRICH.
PHOTOGRAPHIC CAMERA.

No. 436,098. Patented Sept. 9, 1890.

Witnesses:
A. Faber du Faur
William L. Miller

Inventor:
Hermann Heinrich
by A. Faber du Faur Jr.
his Atty.

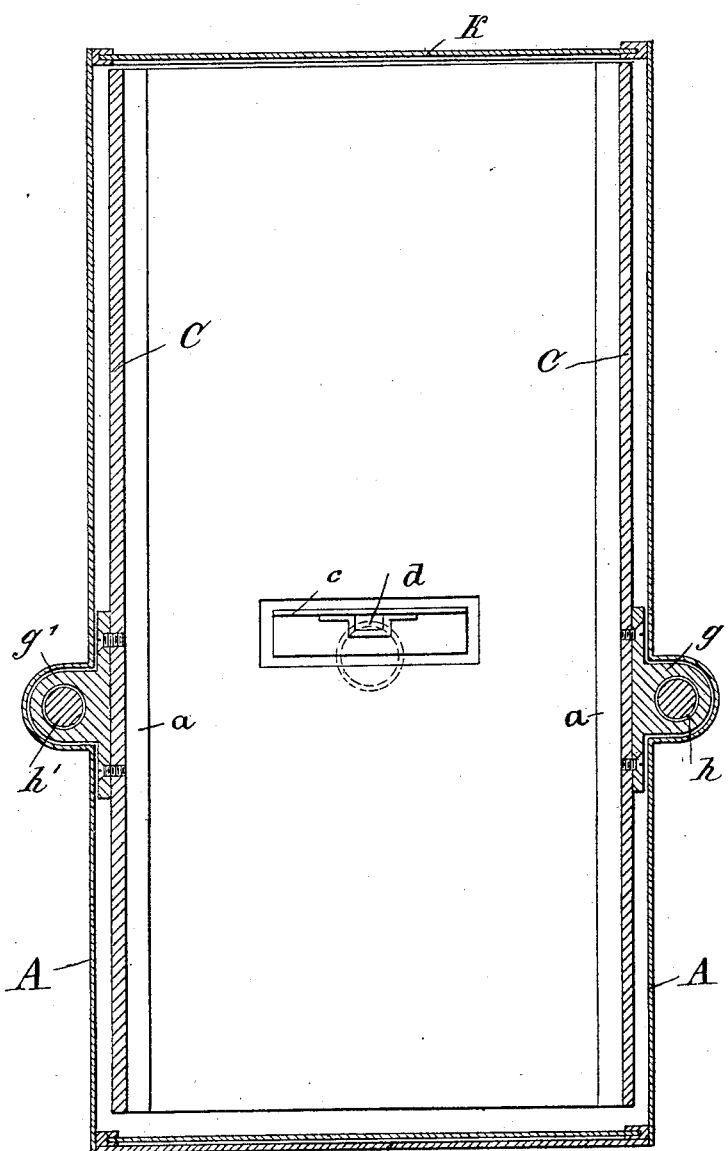

(No Model.) 7 Sheets—Sheet 5.

H. HEINRICH.
PHOTOGRAPHIC CAMERA.

No. 436,098. Patented Sept. 9, 1890.

Witnesses:
A. Faber du Faur
William Miller

Inventor:
Hermann Heinrich
by A. Faber du Faur Jr.
his Atty.

(No Model.) 7 Sheets—Sheet 6.

H. HEINRICH.
PHOTOGRAPHIC CAMERA.

No. 436,098. Patented Sept. 9, 1890.

Witnesses:
A. Faber du Faur
William Miller

Inventor:
Hermann Heinrich
by A. Faber du Faur
his Att'y.

(No Model.) 7 Sheets—Sheet 7.

H. HEINRICH.
PHOTOGRAPHIC CAMERA.

No. 436,098. Patented Sept. 9, 1890.

Witnesses:
A. Faber du Faur
William Miller

Inventor:
Hermann Heinrich
by A. Faber du Faur Jr.
his Atty.

THE NORRIS PETERS CO., PHOTO-LITHO., WASHINGTON, D. C.

UNITED STATES PATENT OFFICE.

HERMANN HEINRICH, OF BERLIN, GERMANY, ASSIGNOR TO BRANDT & WILDE NACHFOLGER, OF SAME PLACE.

PHOTOGRAPHIC CAMERA.

SPECIFICATION forming part of Letters Patent No. 436,098, dated September 9, 1890.

Application filed December 17, 1889. Serial No. 334,079. (No model.)

*To all whom it may concern:*

Be it known that I, HERMANN HEINRICH, a subject of the Grand Duke of Sachsen-Weimar, residing at Berlin, Prussia, Germany, have invented new and useful Improvements in Photographic Cameras, of which the following is a specification.

My invention has reference to improvements in photographic cameras, and especially to that class provided with means for containing a number of plates and for exposing the same consecutively; and it consists in certain novel means for accomplishing this end, and also in a peculiar and novel construction whereby the inadvertent exposure of the same plate a second time is rendered impossible.

The novel features above referred to are fully described in the following specification and claims, and illustrated in the accompanying drawings, in which—

Figure 1:
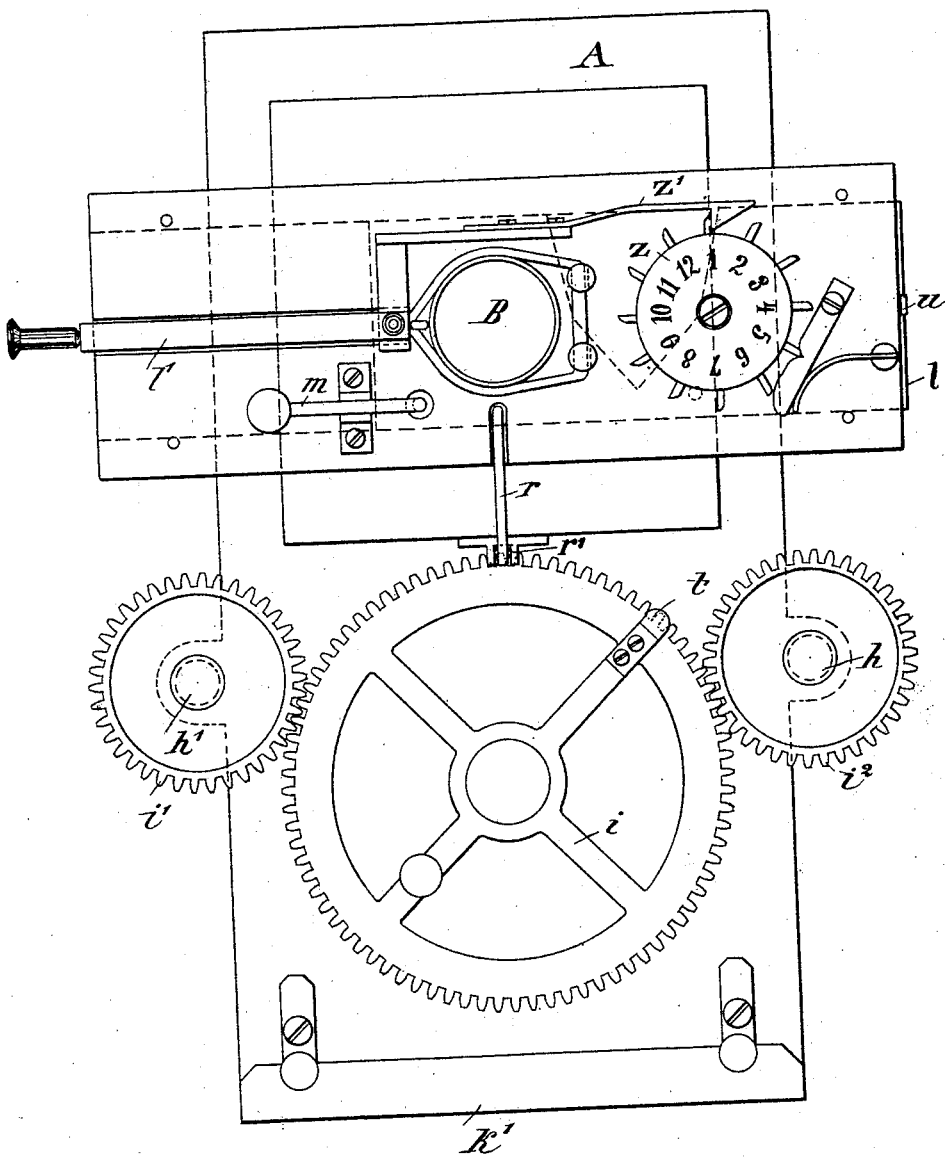
Figure 2:
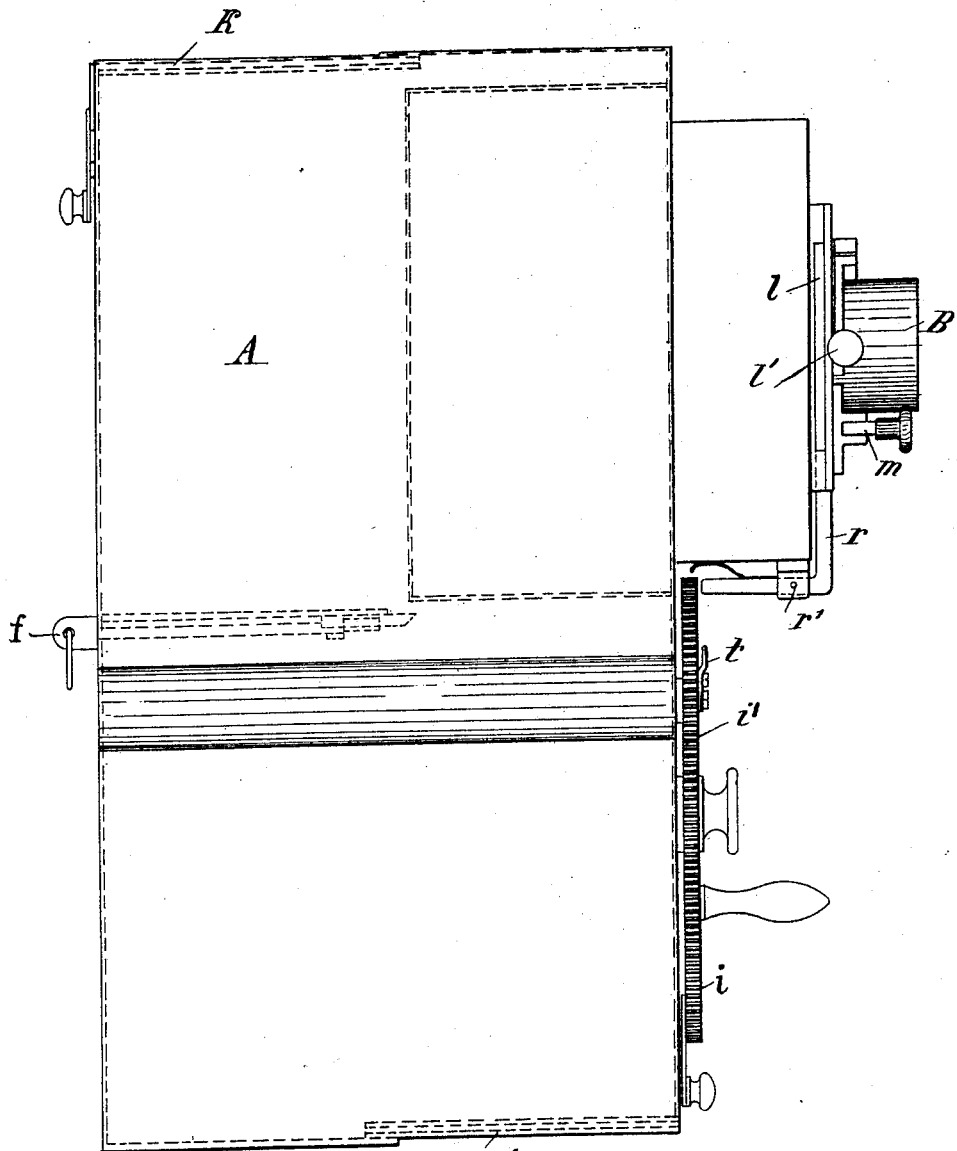
Figure 3:
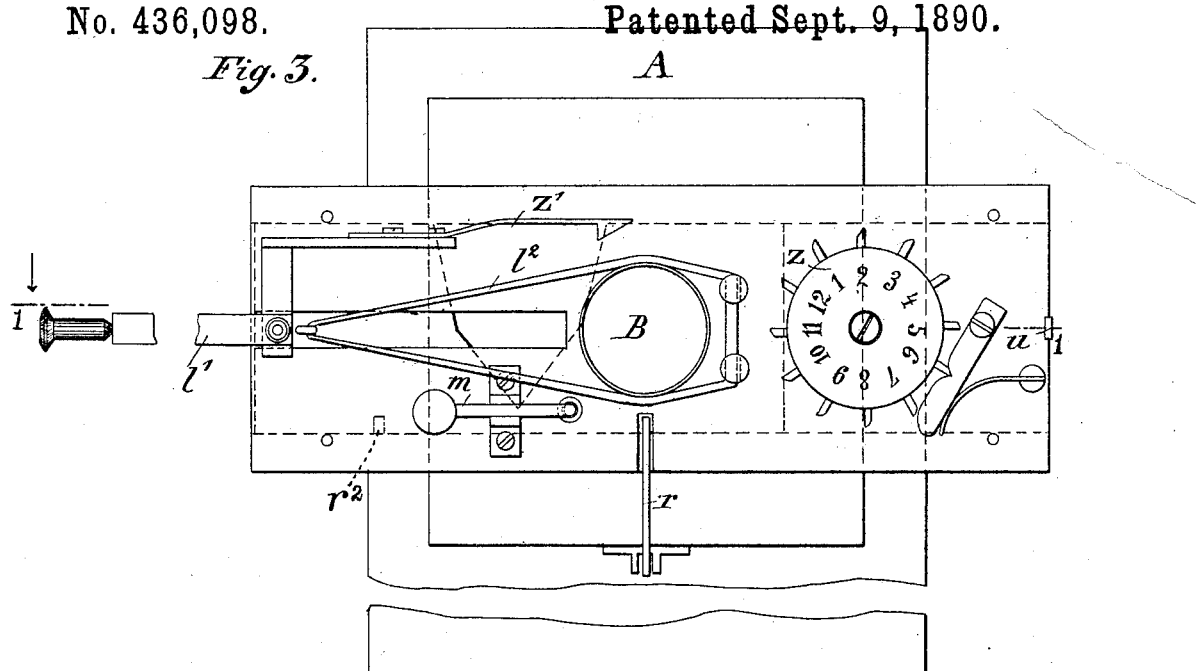
Figure 4:
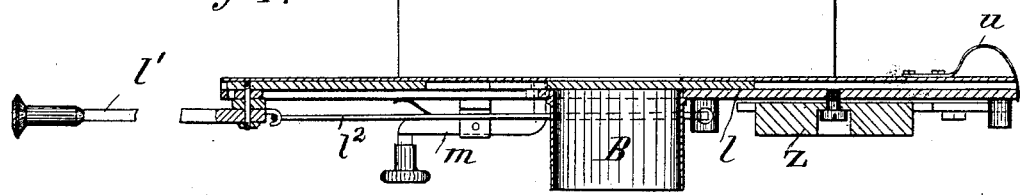
Figures 7, 8:
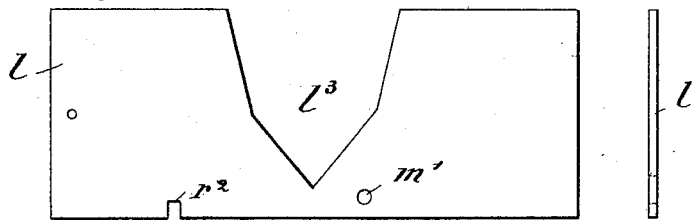
Figure 10:
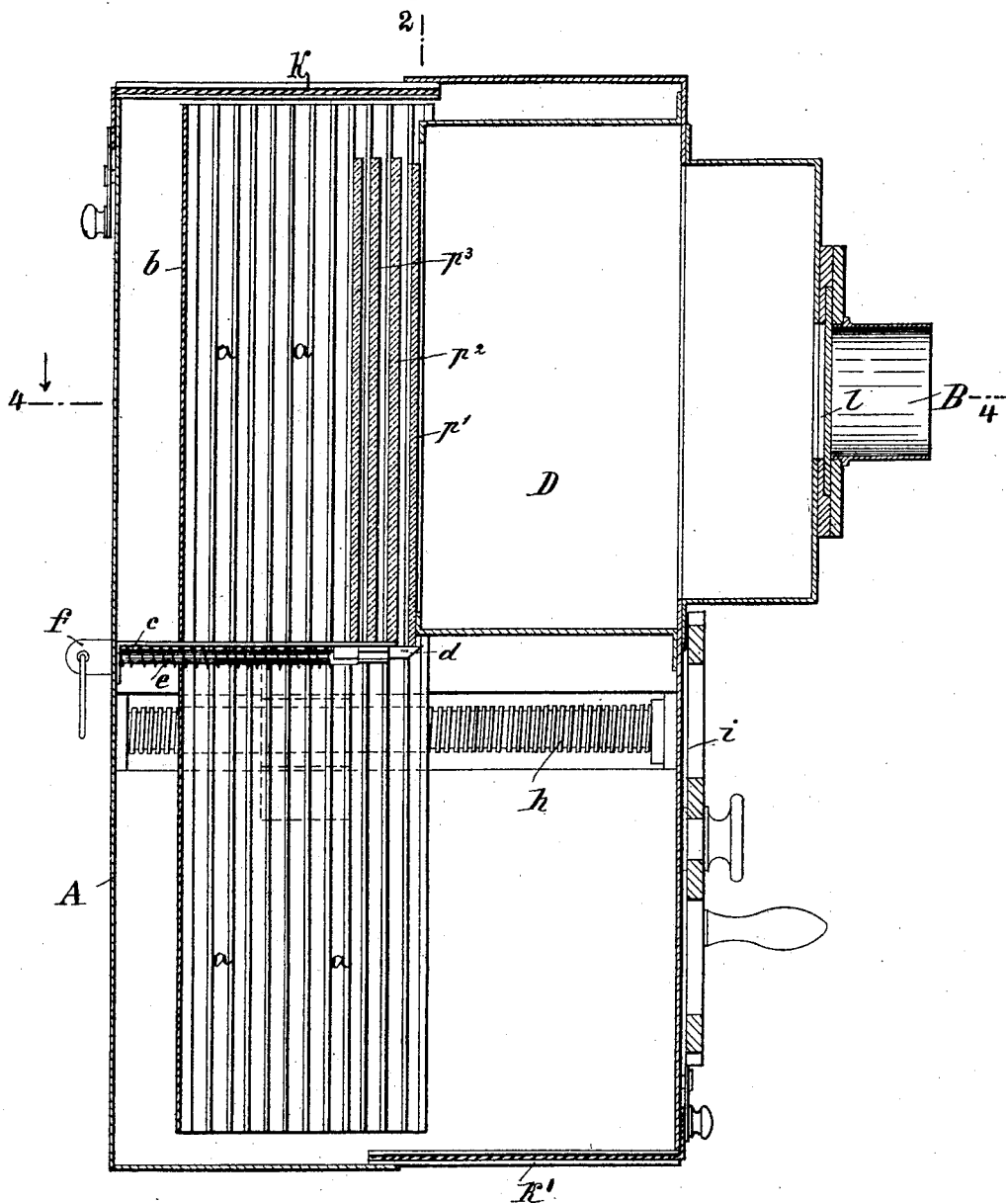
Figure 11:
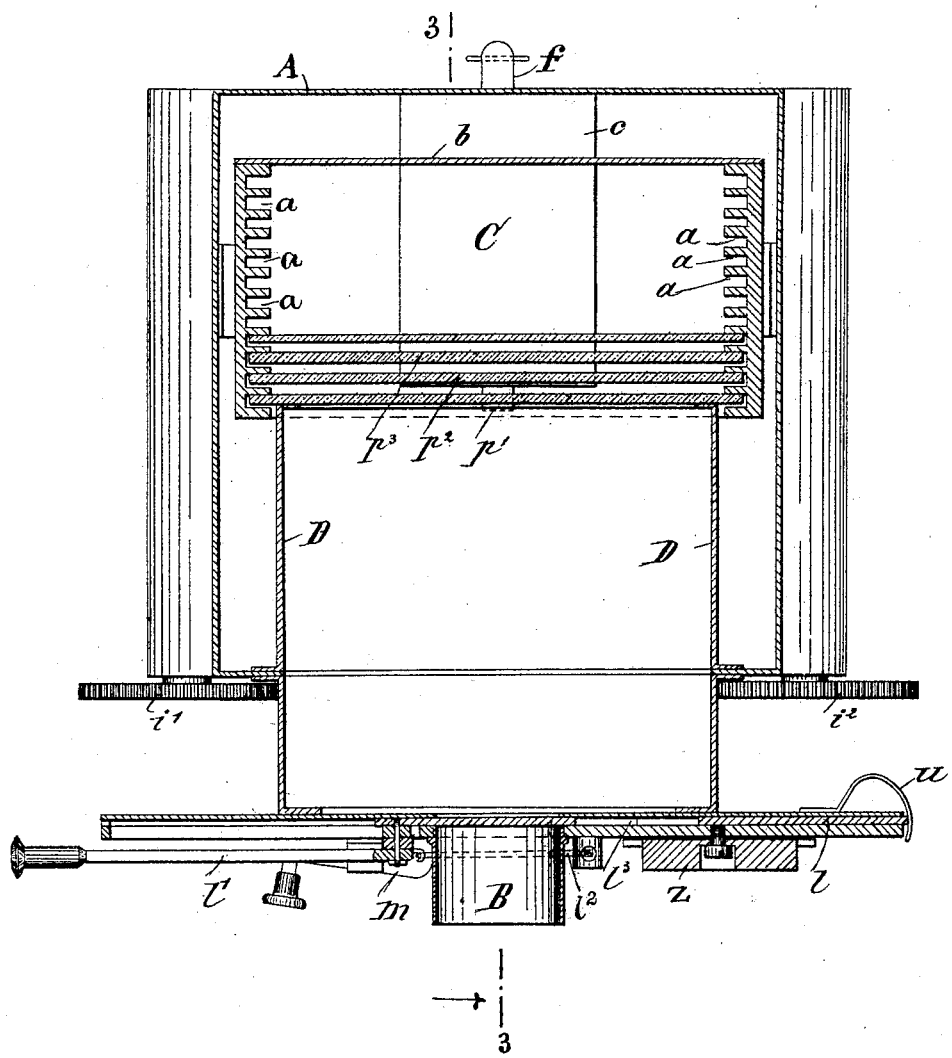
Figure 12:
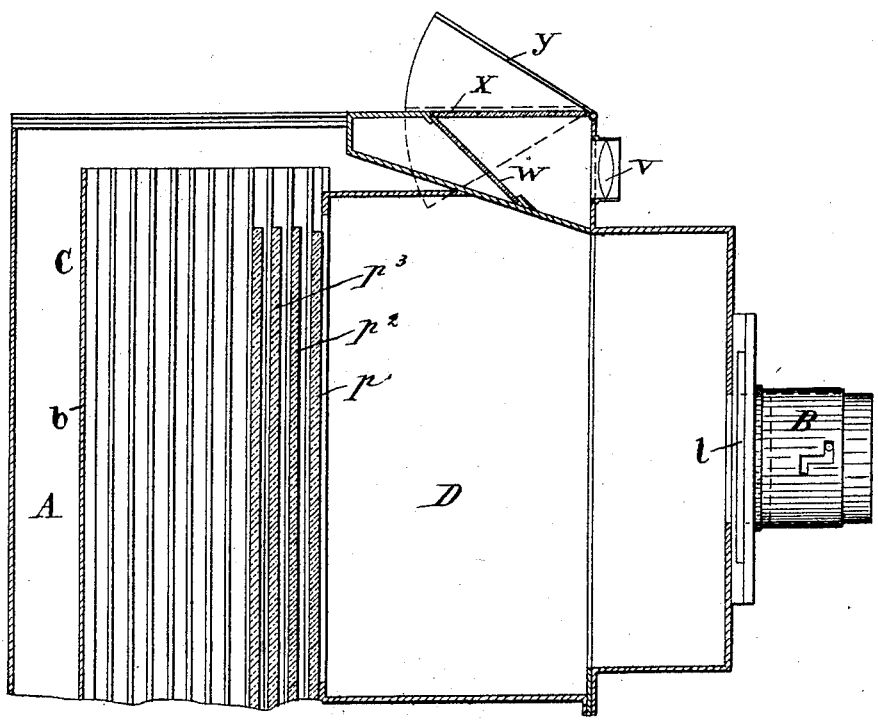

Figure 1 represents a front elevation of a photographic camera constructed according to my invention. Fig. 2 is a side elevation of the same. Fig. 3 is a similar view to Fig. 1, part being broken away, and showing the shutter in a different position. Fig. 4 is a horizontal section in the plane 1 1, Fig. 3. Figs. 5, 6, 7, and 8 represent detail parts. Fig. 9 is a vertical cross-section in the plane 2 2, Fig. 10. Fig. 10 is a vertical longitudinal section in the plane 3 3, Fig. 11. Fig. 11 is a horizontal section in the plane 4 4, Fig. 10. Fig. 12 is a sectional elevation illustrating the finder.

Similar letters indicate corresponding parts throughout the several figures of the drawings.

In the drawings, referring at present more especially to Figs. 2, 10, and 11, the letter A designates the casing of the camera, in the front wall of which is secured the tube B, containing the objective or lens. In the rear part of the casing is located an open frame or magazine C, which is provided on its side walls with a series of parallel vertical grooves $a$ for the reception of the plates $p'$ $p^2$, &c. The plates are thus held separate one from the other, but can freely slide within the said grooves.

The frame or magazine is about equal in height to the casing A, and in the rear wall of the same, at or near the center thereof, is an aperture through which can freely pass a horizontal plate $c$, which is rigidly secured to the back of the casing A, and forms a support or rest for the plates $p^2$ $p^3$, &c. This support consequently retains the plates within the upper half of the camera (see Fig. 10) especially.

The forward plate $p'$—i. e., that nearest the objective or in the correct focal plane—bears against an abutment-frame D, open at both ends, and occupies the position proper for exposure, and it is now the function of the apparatus to successively bring each of the several plates in the magazine into this forward position or correct focal plane and to effect the removal of the respective plates after exposure. To this end the support $c$, Fig. 10, is made of such length that when the magazine C is in its rearmost position the foremost plate $p'$ is not supported by the same, but upon a movable support or slide $d$, held outwardly by a suitable spring $e$. This slide $d$ is provided with a head or handle $f$, whereby it can be withdrawn from beneath the said plate. If the said slide $d$ is withdrawn, the first plate $p'$ falls by its inherent weight into the lower part of the magazine C.

The magazine is adapted to slide toward and from the lens and to telescope with the abutment-frame D, and in order to bring the next plate $p^2$ to the correct focal plane the said magazine is moved until said plate abuts against the said frame. In this position it is supported by the movable support $d$, upon the withdrawal of which after exposure it falls into the lower part of the camera.

To adjust the magazine C after each withdrawal of a plate to bring the next succeeding plate into the correct position, the said magazine is provided on its sides with nuts $g$ $g'$, which engage, respectively, with feed-screws $h$ $h'$, Figs. 9 and 10 especially, secured to and having bearings in the casing A. These feed-screws are rotated simultaneously by means of a central gear-wheel $i$ and gear-wheels $i'$ and $i^2$, secured to the respective feed-screws and meshing into the gear $i$.

(See Figs. 1, 2, and 10 especially.) The central wheel $i$ is provided with a suitable handle for turning it.

In the upper part of the casing A is an opening through which the plates are introduced into the upper part of the magazine. This opening is closed by a suitable sliding door K, Figs. 3 and 9.

The plates dropped into the lower part of the magazine can be removed for development through an opening in the bottom of the casing A, which can be closed by a sliding door K'.

In cameras having a repeated action it sometimes occurs that by inadvertence the same plate is exposed twice, thereby spoiling the negative. To avoid this it is proposed to have the mechanism which actuates the magazine so connected with the shutter that the latter cannot be moved after each exposure until the magazine has been moved to present a new plate in the proper position for a new exposure.

Figure 5:
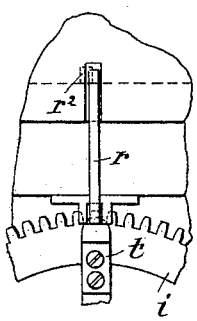
Figure 6:
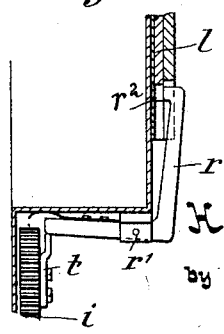

Referring to Figs. 1, 2, 3, 4, 7, and 12, $l$ is the shutter arranged to slide across the tube B and provided with a suitable handle $l'$, for moving it by hand. It is provided with an aperture $l^3$, as usual, and is subjected to the action of a suitable spring, which may be in the form of an elastic band $l^2$, and when drawn to its outward position, Fig. 3, it is retained by a spring-lock $m$, which engages with an opening $m'$ in said shutter. By depressing the head of said lock it is caused to release the shutter. To the front of the casing A is pivoted at $r$ a locking-lever $r'$, which is adapted to enter a notch $r^2$ in the shutter $l$, Figs. 6 and 7 especially, when the latter is in the position shown in Figs. 1 and 11, to lock the shutter, whereby it is impossible to shift it without releasing it from said lever. The shutter is released automatically from the lever $r'$ in moving the magazine to present a new plate for exposure by the following means:

On the gear-wheel $i$, Figs. 1, 5, and 6, of the mechanism for shifting the magazine is secured a tappet $t$, which is adapted to impinge upon the locking-lever $r'$ as the said wheel H is rotated to turn said lever about its pivot $r'$ and out of engagement with the shutter. During the disengagement of the lever $r'$ from the shutter a flat spring $u$, against which the forward end of the shutter bears, moves the latter slightly toward the left, so that after the tappet has released the lever the notch $r^2$ is out of alignment with said lever, and the shutter can now be drawn in position for the next exposure. The shutter on being released from the lock $m$ for the exposure strikes against the spring $u$ and forces the latter backward, so that the lever can enter the notch $r^2$ to again lock the shutter.

To indicate the number of plates which have been withdrawn from the magazine, I provide a counter Z, the dial-plate of which is provided with numbers to correspond to the number of plates, ranging in this case from one to twelve. The dial-plate is provided with peripheral teeth adapted to be engaged by a spring-pawl Z', carried by the handle $l'$ of the shutter $l$. At each withdrawal of the shutter the dial-plate is rotated through one-twelfth of a revolution. In practice the shutter mechanism is inclosed in a suitable case, (not shown,) opposite an aperture in which the numbers of the dial are arranged so that the number of plates used can be readily seen.

It is evident that the instantaneous shutter can be changed into and used as a time-shutter. For this purpose the shutter is so adjusted that the aperture $l^3$ is directly opposite the objective. By the use of a suitable cap (not shown) the exposures can be made. The shutter may be retained in this position by any suitable means. When the time of exposure has terminated and the cap put on again, the shutter may be released to close off the lens, thereby rendering the entrance of light impossible in case the cap should be inadvertently removed.

As shown in Fig. 12, the tube in which the lens is secured is attached to the tube B by a joint resembling a bayonet-joint, so that it can be moved in and out, but cannot become detached. In the same figure I have shown the camera provided with a finder. The image of the object formed by the lens $v$ is reflected by mirror W on the ground-glass plate X, where it can be observed, and the camera adjusted accordingly. The plate X is provided with a cover $y$, which can be closed to insure the plate against breakage.

What I claim as new, and desire to secure by Letters Patent, is—

1. In a photographic camera, a magazine for the reception of the plates, arranged in line with the lens, an abutment against which the plate to be exposed bears, said magazine being adapted to telescope about the abutment, a support for the plates rigidly secured to the wall of the camera and projecting through an opening in the rear of the magazine to divide the same into two chambers, one above the other, said support forming a rest for all the plates, with the exception of the plate under exposure, a movable support upon which the plate under exposure rests, said support being operated from the exterior of the camera to release the plate after exposure, and means for adjusting the magazine to bring the plates successively against the abutment, substantially as described.

2. In a photographic camera, a magazine provided with vertical grooves $a\,a$ for the reception of the plates, a horizontal support for said plates rigidly secured to the casing of the camera, a movable support for the plate to be exposed, feed-screws $h\,h'$, and gear-wheels $i\,i'\,i^2$ for simultaneously turning the feed-screws to adjust the magazine, substantially as described.

3. In a photographic camera, a magazine, means for adjusting the same, a shutter, means for locking the same, and an intermediate device actuated by the adjusting mechanism of the magazine to effect the release of the shutter, substantially as described.

4. In a photographic camera, a magazine, feed-screws $h\ h'$ and gear-wheels $i\ i'\ i^2$ for adjusting the same, a locking-lever engaging with the shutter, and a tappet carried by the gear-wheel $i$, for releasing the shutter from the locking-lever, whereby an exposure cannot take place until the magazine has been adjusted, substantially as described.

5. In a photographic camera, a magazine, means for adjusting the same, a shutter provided with a notch, a locking-lever adapted to engage with said notch, a device, in connection with the feed mechanism of the magazine, adapted to operate said lever to unlock the shutter, and the spring $u$, substantially as described.

6. In a photographic camera, a magazine, a shutter controlled by the adjusting mechanism of the magazine, and a counter actuated by the movement of the shutter, substantially as described.

7. In a photographic camera, a movable magazine for the reception of the plates, a fixed support extending through an opening in the rear of the magazine, a spring-pressed movable support operated from the exterior of the camera, an abutment, as D, and means for adjusting the magazine, substantially as described.

In testimony whereof I have signed my name to this specification in the presence of two subscribing witnesses.

HERMANN HEINRICH.

Witnesses:
 EDUARD PEITZ,
 G. HÜLSMANN.